(12) United States Patent
Chang et al.

(10) Patent No.: US 8,568,838 B2
(45) Date of Patent: Oct. 29, 2013

(54) POWER CONTROL FOR DENSIFICATION OF ONE OR MORE POROUS ARTICLES

(75) Inventors: Kenny H. Chang, Union, KY (US);
Bruce Zimmerman, Verona, KY (US);
Arnaud Fillion, Independence, KY (US)

(73) Assignee: Messier-Bugatti-Dowty, Velizy-Villacoublay (FR)

( * ) Notice: Subject to any disclaimer, the term of this patent is extended or adjusted under 35 U.S.C. 154(b) by 722 days.

(21) Appl. No.: 12/376,396

(22) PCT Filed: Aug. 7, 2007

(86) PCT No.: PCT/EP2007/058197
§ 371 (c)(1),
(2), (4) Date: Apr. 9, 2009

(87) PCT Pub. No.: WO2008/017678
PCT Pub. Date: Feb. 14, 2008

(65) Prior Publication Data
US 2010/0156005 A1  Jun. 24, 2010

Related U.S. Application Data

(60) Provisional application No. 60/821,596, filed on Aug. 7, 2006.

(51) Int. Cl.
*H05B 6/02* (2006.01)
*H05B 6/24* (2006.01)
*C23C 8/54* (2006.01)
*B29C 39/00* (2006.01)
*B29C 67/20* (2006.01)

(52) U.S. Cl.
USPC ........... 427/591; 427/590; 427/543; 427/228; 264/406; 264/413; 264/414

(58) Field of Classification Search
USPC ........... 427/228, 430.1, 443.2, 534, 544, 590, 427/591; 264/406, 413, 414
See application file for complete search history.

(56) References Cited

U.S. PATENT DOCUMENTS

| | | | |
|---|---|---|---|
| 4,472,454 A | 9/1984 | Houdayer et al. | |
| 5,165,049 A | 11/1992 | Rotman | |
| 5,348,774 A * | 9/1994 | Golecki et al. | 427/543 |
| 5,389,152 A * | 2/1995 | Thurston et al. | 118/429 |
| 5,397,595 A | 3/1995 | Carroll et al. | |
| 5,547,717 A | 8/1996 | Scaringella et al. | |
| 5,733,611 A | 3/1998 | Thurston et al. | |
| 5,981,002 A | 11/1999 | Connors, Jr. | |
| 6,726,962 B1 * | 4/2004 | Loszewski | 427/443.2 |

FOREIGN PATENT DOCUMENTS

| | | |
|---|---|---|
| EP | 0592239 A2 | 4/1994 |
| EP | 1718117 A1 | 11/2006 |
| WO | WO01/52602 A1 | 7/2001 |

* cited by examiner

*Primary Examiner* — Michael Wieczorek
(74) *Attorney, Agent, or Firm* — Preti Flaherty Beliveau & Pachios LLP

(57) ABSTRACT

A method of controlling power applied to an induction coil assembly used for densifying porous articles with a liquid matrix precursor. The control of applied power addresses dynamic changes in the electrical characteristics of the porous article being densified as it becomes denser. In particular, the power applied is controlled in accordance with changes in resonant frequency of the coupled system of the induction heating system and the porous article.

10 Claims, 14 Drawing Sheets

POWER CONTROL FOR DENSIFICATION OF ONE OR MORE POROUS ARTICLES

This application claims priority from U.S. Provisional Application No. 60/821,596 filed on Aug. 7, 2006, the contents of which is incorporated herein by reference.

FIELD OF THE INVENTION

The present invention relates to densifying porous articles with a desirably high rate of production, particularly, but not necessarily only, in the field of friction braking articles, such as aircraft brakes. The invention more particularly relates to improving process control during densification.

BACKGROUND OF THE INVENTION

In the field of friction materials, it is generally known to use porous materials to manufacture friction members, such as using porous preforms for manufacturing friction brake disks. The manufacture of such friction members generally begins with the construction of a porous preform. For example, in many friction brake applications, annular preforms are used.

The porous preforms (annular or otherwise) can be constructed using several different known methods (which are not germane to the present invention). In any event, it is desirable to further densify the resulting porous preform (especially, but not necessarily only, with a carbonaceous material) so as to obtain desired friction and mechanical properties.

Chemical vapor infiltration ("CVI") is a widely used conventional technique in this regard for obtaining carbon/carbon composite materials. CVI uses a hydrocarbon-containing gas to infiltrate a porous preform. The CVI gas is then cracked under high temperatures so as to leave a carbon coating on the fiber structure of the preform.

Conventional CVI typically requires several hundred hours of processing in order to obtain a carbon/carbon ("C/C") structure having a desired density and mechanical properties. By way of example, a typical, conventional CVI process includes a first infiltration cycle performed, for example, over approximately 300-500 hours or more.

However, conventional CVI frequently causes rapid blockage of the surface porosity of the preform before interior portions of the preform are adequately densified. The hydrocarbon-containing gas therefore can no longer diffuse into interior undensified parts of the preform. In order to "reopen" the surface porosity to permit further densification, an intermediate machining step becomes necessary. In general, this intermediate machining (using a known method, such as milling) removes surface layers of the preform having carbon-blocked pores to expose open pores of the preform so that the hydrocarbon gas can again infiltrate the preform structure. Taking into account that several hundred preforms are densified in a typical densification processed, the intermediate machining of individual preforms can add as much as 48 hours to the overall conventional CVI densification process.

Once the intermediate machining of the partially densified articles is completed, a second CVI process is performed to make use of the reopened surface porosity of the preforms. This second CVI process step can last, for example, another 300-500 hours or more. This generally completes the conventional densification process using CVI.

Another approach to densifying porous preforms generally uses a liquid instead of gaseous hydrocarbon precursor. This method of densification is sometimes referred to in the art as "film boiling" or "rapid densification."

The use of liquid precursors for densification is discussed in, for example, U.S. Pat. Nos. 4,472,454, 5,389,152, 5,397,595, 5,733,611, 5,547,717, 5,981,002, and 6,726,962. The content of each of these documents is incorporated herein by reference.

Film boiling densification generally involves immersing a porous preform in a liquid hydrocarbon so that the liquid substantially completely infiltrates the pores and interstices of the preform. Thereafter, the immersed preform is inductively heated to a temperature above the decomposition temperature of liquid hydrocarbon (typically 1000° C. or more). More particularly, the liquid hydrocarbon adjacent to the inductively heated preform structure dissociates into various gas phase species within the preform porosity. Further thermal decomposition of the gas phase species results in the formation of pyrolitic carbon on interior surfaces in the open regions of the porous material, such that the porosity of the preform is reduced.

The concept of inductive heating in this field is generally known, including as described in the aforementioned references. Film boiling densification can be performed much faster than gas-based CVI processes. For example, film boiling can be substantially completed in as few several hours, versus the above-described hundreds of hours for CVI.

The benefit from faster processing times could be further enhanced by processing multiple preforms together in a process cycle. However, conventional approaches to constructing inductive heating apparatuses for treating multiple parts are electrically complex, requiring load balancing and the like.

SUMMARY OF THE INVENTION

In view of the foregoing, the present invention relates to the densification of porous articles while addressing one or more of the issues known in the conventional art as noted above, in accordance with the invention as claimed hereinbelow.

BRIEF DESCRIPTION OF THE DRAWINGS

The present invention will be even more clearly understood with reference to the figures appended hereto, in which.

All drawings in the application are illustrative and by way of the example. Proportions and scales may or may not be actual.

DETAILED DESCRIPTION OF THE INVENTION

Solely by way of example and/or illustration, mention is made hereinbelow of porous preforms, such as porous carbon preforms for manufacturing friction brake disks. It is expressly noted, however, that the present invention is more generally applicable to densifying other kinds of porous substrates in the manner described.

Figure 1:
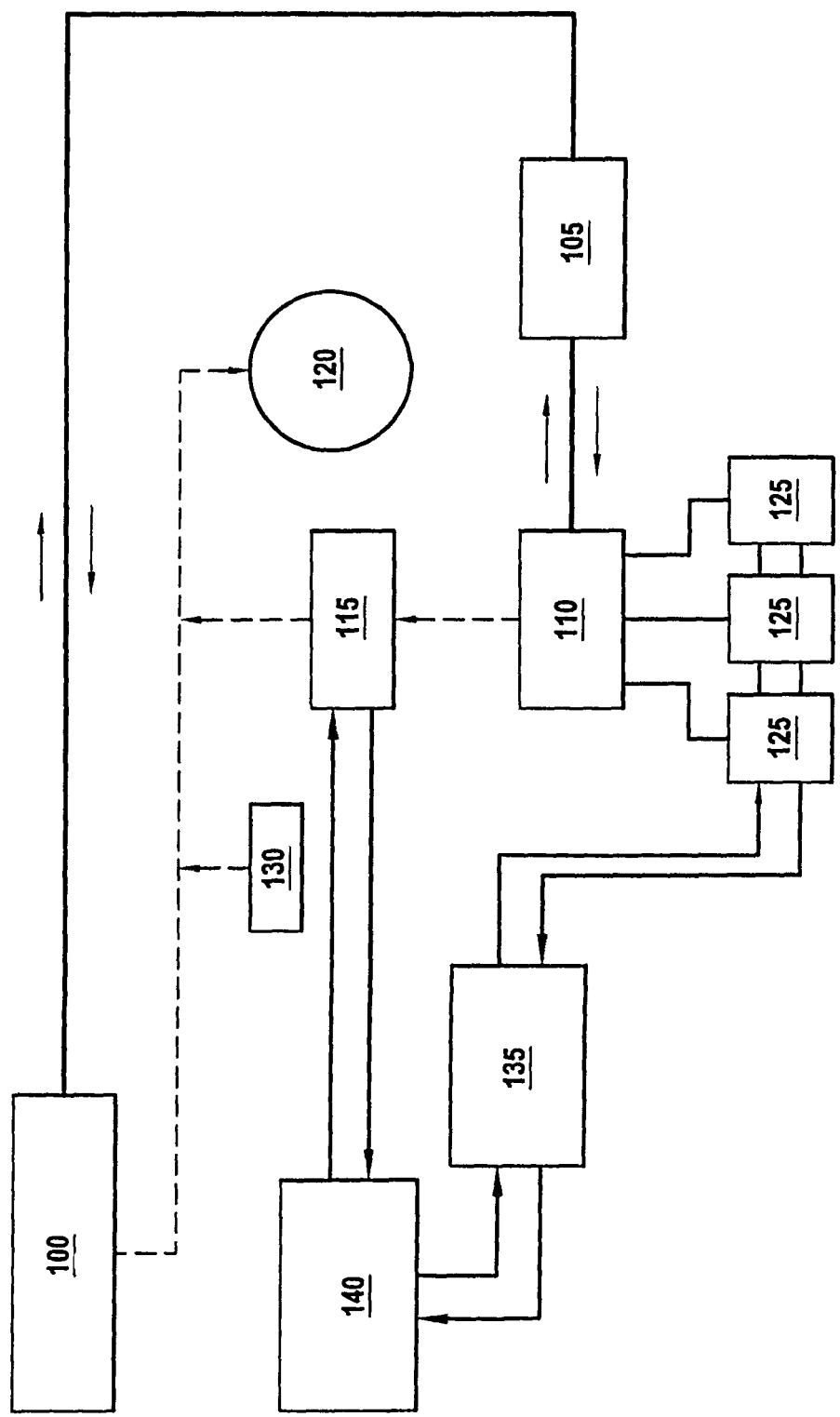
FIG. 1 is a schematic view of a film boiling densification installation relevant to the present invention.

A highly schematic representation of a facility for performing densification using liquid precursors is set forth in FIG. 1. The system can include a remote liquid precursor storage site 100 (including, for example, a fluid transfer system) for managing the transport of new and used precursor liquid. One example of a precursor liquid used according to the present system is a liquid hydrocarbon, such as cyclohexane ($C_6H_{12}$). For example, a tank "farm" of one or more remote storage tanks (collectively indicated at 100) for the liquid precursor may be provided. The tank farm could also include one or more tanks for at least initially storing used liquid precursor. It may be desirable or even required (depending on applicable industrial requirements) to keep at least the tank farm 100 at some distance from the rest of the facility for safety reasons. For example, some local and/or national ordinances require separation on the order of hundreds of feet.

The facility may optionally include a relatively smaller local storage tank 105 for keeping a relatively small quantity of new precursor liquid close to the processing equipment, if desired.

The piping system (including pumps and the like) used to interconnect various parts of the facility is conventional and may be of any construction and arrangement appropriate for the transport of liquid precursor being used, particularly, but not necessarily only, liquid hydrocarbons. The fluid transfer system is preferably but not necessarily computer-controlled. Commercially available computer-controlled systems (for example and without limitation, those commercially available from the company OPTO 22) can be used for monitoring and controlling this type of fluid transfer system, including loading of new liquid precursor from an outside supplier.

The liquid precursor is supplied to one or more reaction chambers (collectively indicated at 110) from the local precursor storage tank 105. Preferably, sufficient liquid precursor is provided to substantially immerse the one or more preforms being densified therein, as well as the induction heating coils associated therewith.

As mentioned before, the film boiling process creates gaseous species that in part causes the formation of pyrolitic carbon on interior surfaces of the preform porosity. Excess precursor vapor is captured to the extent possible and condensed at the conventional condenser unit 115 for possible recycling to storage site 100 in the process. A commercial cooling tower 140 is available to maintain an adequate water temperature for cooling the condenser unit 115.

Effluent gas that is still left over is may be conveyed to an optional conventional thermal oxidizer 120 to burn off residual hydrocarbons in the effluent gas.

Electricity from the AC power supply 125 is transferred to the induction coils 25 (schematically illustrated in FIGS. 2 and 3) by metal bus bars 30 constructed according to a given arrangement of elements in a facility and according to appropriate desired dimensional considerations. The bus bars may be made from copper, for example. The bus bars 30 may be optionally water-cooled by water cooling networks 50 (see FIG. 2, for example). Each power supply 125 may have remote proportional-integral-derivative (PID) loop control capability and can be monitored and controlled from a computer control terminal. Power density control, voltage control, current control, frequency control, and/or temperature control of the densification process are contemplated in the present invention, individually or in various combinations thereof, as discussed hereinbelow.

Figure 2:
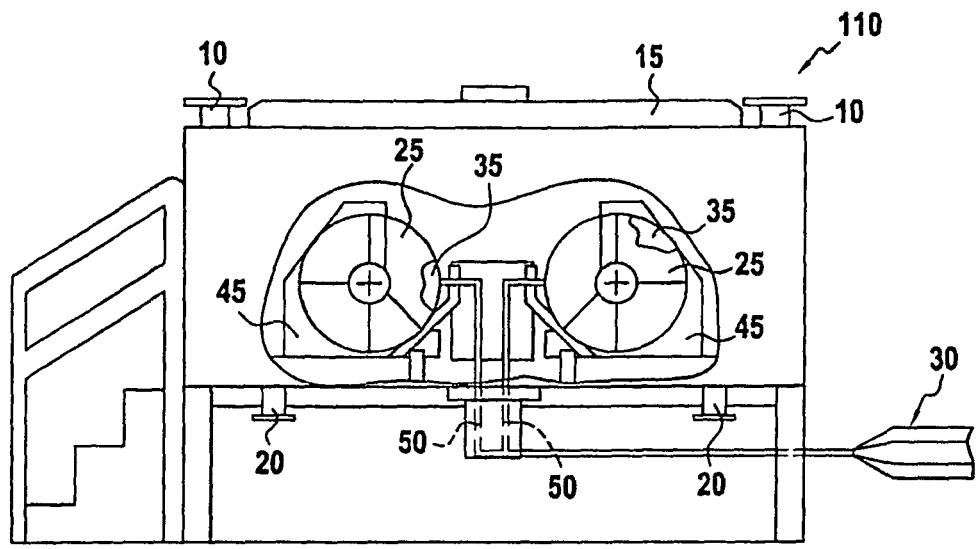
FIGS. 2 and 3 are partially cutaway side and top schematic views of a reaction chamber for processing multiple porous articles, such as brake preforms, according to the present invention.
Figure 3:
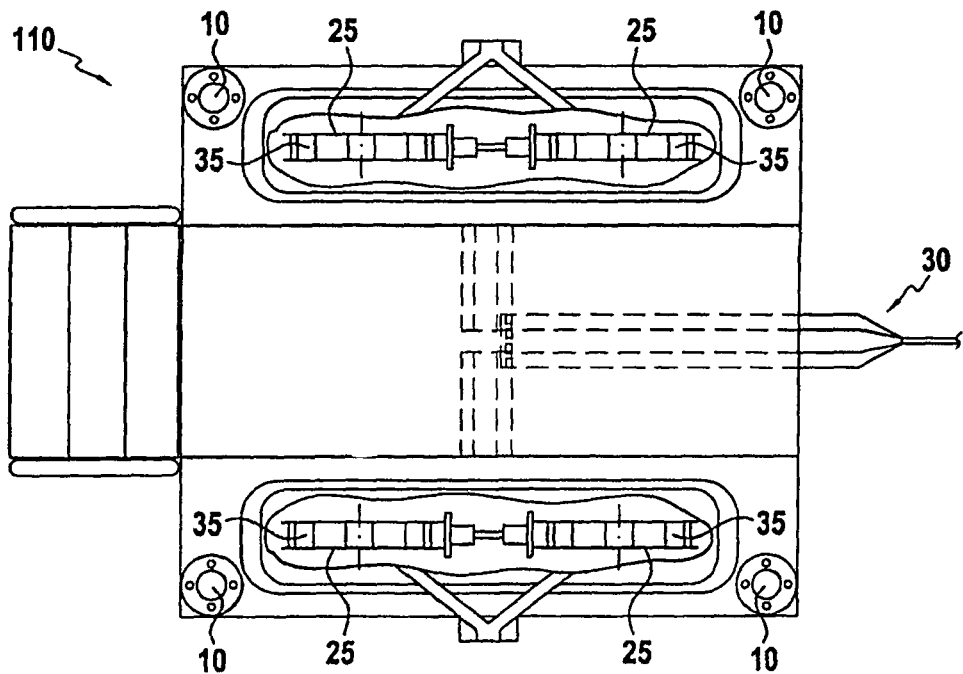

FIG. 2 is a partially cutaway side view of a reaction chamber 110 constructed and arranged to process one or more porous preforms therein. FIG. 3 is a corresponding partially cutaway plan view of reaction chamber 110.

The reaction chamber 110 has, for example, two pairs of induction heating coil sets 25 corresponding to each preform 35 that is to be processed (see FIG. 3). The induction coils sets 25 each comprise a pair of spaced apart induction coils preferably mounted in position using non-reactive thermally stable supports made from, for example, an electrically non-conductive glass composite material 45 (such as that known in the art as "G-10") that can withstand, for example, a liquid hydrocarbon environment. The induction heating coils 25 are each preferably water-cooled pancake spiral coils, and may be made from copper metal. For this reason, it is desirable to provide a heat exchanger 135 (see FIG. 1) dedicated to the water-cooling system for the induction coils 25. The heat exchanger 135, if present, may be connected in a known manner to cooling tower 140 (see FIG. 1). In use, a preform (or worn brake) 35 being densified is heated by direct coupling from the induction coils 25 on either side thereof (see also FIG. 5).

In an example of loading and unloading coil/reactor chamber 110, a top cover panel 15 is provided with a conventional locking mechanism (such as conventional bolts) for sealing the chamber 110. Each reactor chamber 110 (as many as are provided) is provided with a common liquid precursor supply line connection 20, and a common exhaust line 10 operably connected to the condenser 115 and thermal oxidizer 120, respectively. For clarity of illustration, the external connections to exhaust line 10 and precursor supply line 20 are not shown in FIGS. 2 and 3, but are in accordance with the schematic illustration in FIG. 1.

Figure 8:
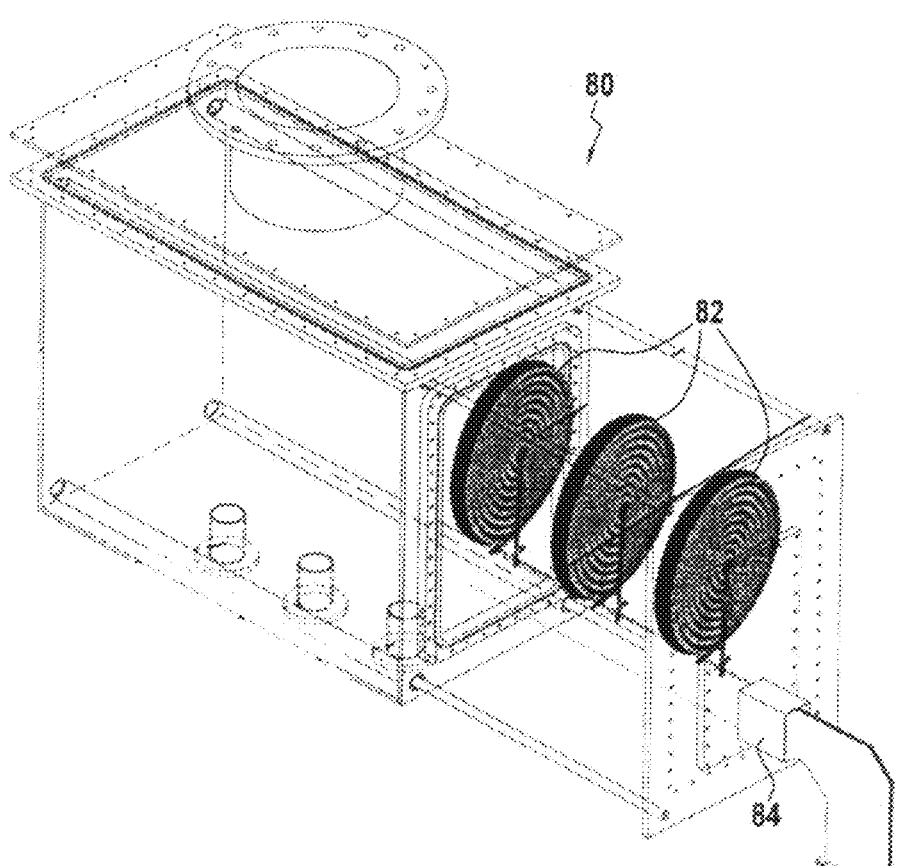
FIG. 8 is a schematic perspective view of another alternate arrangement for densifying multiple porous articles.
Figure 9A:
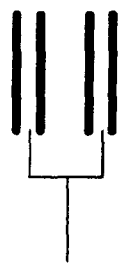
FIGS. 9a-9h illustrate various non-limitative schematic examples of how electrical power can be provided in electrical parallel to a plurality of inductive heating coils for densifying multiple porous structures.
Figure 9B:
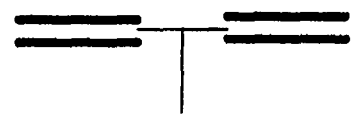
Figure 9C:
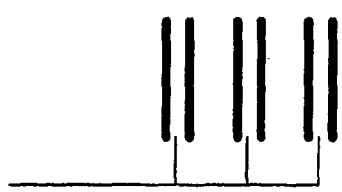
Figure 9D:
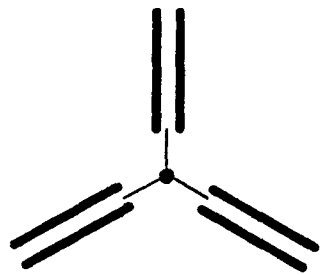
Figure 9E:
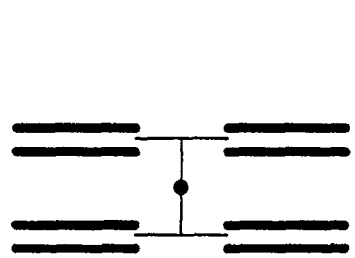
Figure 9F:
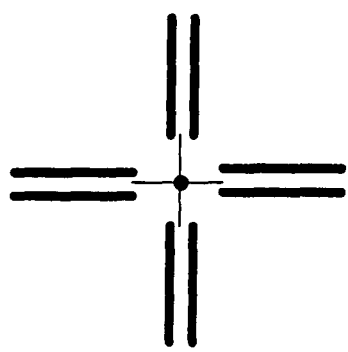
Figure 9G:
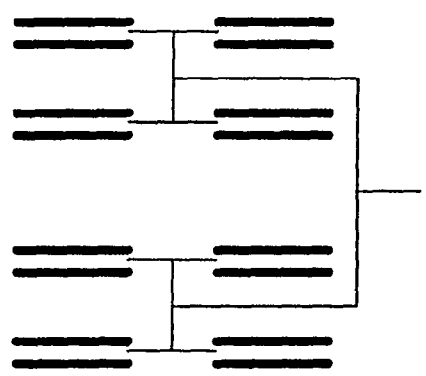
Figure 9H:
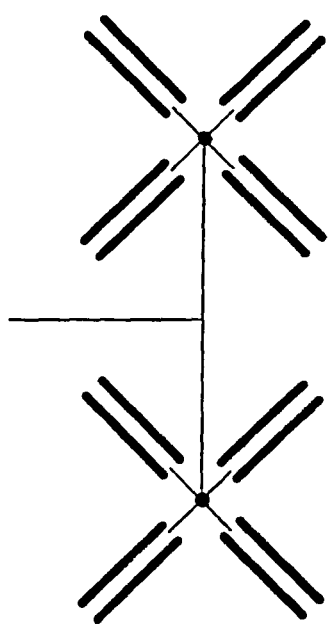
Figure 10A:
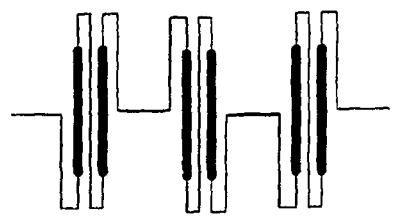
FIGS. 10a-10c illustrate various non-limitative schematic examples of how electrical power can be provided in electrical series to a plurality of inductive heating coils for densifying multiple structures.
Figure 10B:
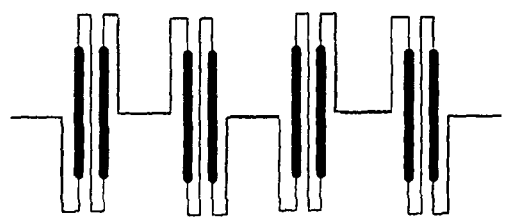
Figure 10C:
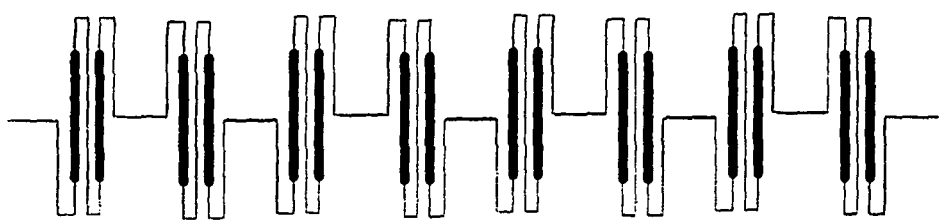
Figure 11A:
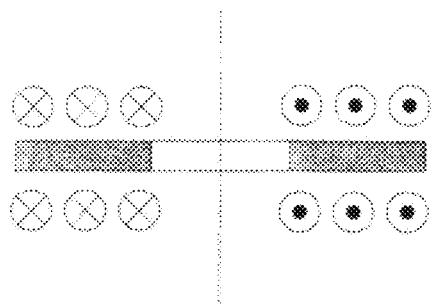
FIGS. 11a-11d illustrate various non-limitative schematic examples of the current sense in inductive heating coils according to the present invention.
Figure 11B:
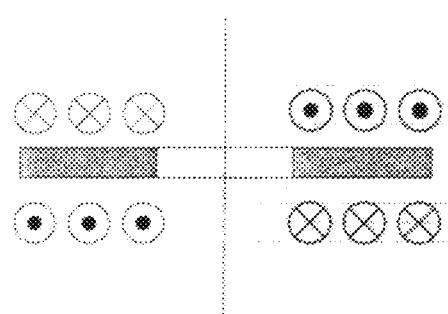
Figure 11C:
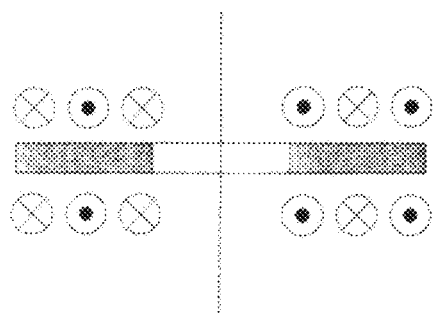
Figure 11D:
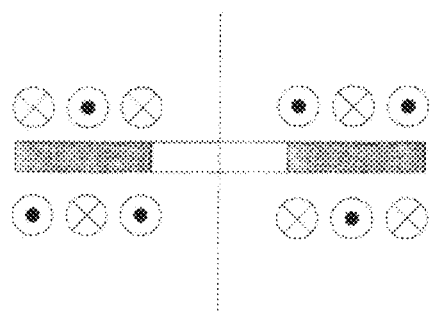

It is noted that FIG. 8 illustrates a different reaction chamber design 80, in which a plurality of preforms 82 are front loaded on a rack-like structure that can be slid (as indicated by the into the reaction chamber space.

Each reactor chamber 110 can be desirably filled, drained, and monitored from a computer control system. The exhaust liquid precursor vapor from the densification process is condensed and eventually fed back to the reactor chambers 110, whereas residual effluent gas is then taken to the thermal oxidizer 120 and burned.

For example, the reactor chambers could be suitably manufactured from aluminum. Other suitable materials are nonmagnetic and may include, without limitation, glass, stainless steel, ceramic or combinations thereof. Dedicated inner buses and coils are provided depending on the size of the preforms being densified. Typical examples of preform diameters range from about 10" to about 25". Particularly common examples include 15" and 20" diameter preforms.

Because volatile liquid hydrocarbons are a particular example of the liquid precursor used in the present invention, it is desirable (but not, obligatory) to provide an inert gas supply system (not shown) to, for example, flush out the piping systems and generally fill voids in the system with an inert gas (instead of oxygen-containing air) so as to decrease the risk of combustion. Nitrogen gas is an example of an appropriate inert gas for this purpose. Furthermore, empty spaces in both the remote and local liquid precursor storage tanks may be maintained at a slight, continuously supplied, overpressure of nitrogen (or other conventionally known inert) gas so as to prevent potentially dangerous accumulations of volatile vapors. Hydrocarbon species mixed with the exhausted nitrogen gas are sent to the thermal oxidizer 120 so that the hydrocarbons can be burned off before the gas is exhausted to the exterior.

Also, because the system uses a "wet" process, it is useful to provide a drying oven 130 in the system to dry off densified preforms following densification. The exhaust from such a drying oven 130, if present, is preferably also connected to the thermal oxidizer 120 in order to process heavy and light aromatics entrained in the resultant effluent gas. With respect to safety considerations, it is useful to use an oven structure that is structurally resistant to failure in the event of an explosion therein, given the presence of volatile gases in the oven during drying. The drying process can be, for example, computer controlled in order to simplify process control.

The material that is deposited within the pores of the porous article according to the present invention can be (strictly by way of example and without limitation) carbon, silicon carbide, silicon nitride, carbon-silicon carbide, or carbon-silicon nitride.

The material deposited (sometimes referred to in this domain as a "matrix" material) corresponds to the selection of the liquid precursor used. For example, to deposit carbon within the preform, a hydrocarbon such as cyclohexane, n-hexane, benzene, toluene, or combinations thereof can be used. Methyltrichlorosilane, dimethyldichlorosilane, and methydichlorosilane, tris-n-methyl amino silane, or other organosilane mixtures can be used for depositing silicon carbide and silicon nitride. Moreover, the precursor liquid can be chosen to co-deposit materials. For example, a mixture of silicon carbide and silicon nitride can be deposited using tris-n-methyl amino or other silane compound. Also co-deposited material such as carbon-silicon carbide and carbon-silicon nitride can be produced with an appropriately selected mixture of precursors. Depending upon the desired matrix, silicon carbide or silicon nitride interface coating can be produced during an early stage of the densification or co-deposited throughout the matrix densification.

It is thought that rotating a preform during densification might usefully enhance the densification process. Therefore, a preform could be mounted with respect to corresponding induction coils such that the preform is rotated about its center during densification, under influence of the induction coils. For example, a mounting assembly could be provided at the center of a given preform that could be appropriately connected to a rotational driving device located outside of the respective reaction chamber. The rate of rotation of the preform might be from about one to about five revolutions per minute, as currently contemplated.

It can be useful according to the contemplated system to provide the coils and/or the buses with a non-stick electrically insulating coating, such as polytetrafluoroethylene or a resin polyepoxide (i.e., epoxy) to prevent electrical load faults or shorting caused by inadvertent contact between the preform and the coil and/or bus.

In one contemplated example, the induction coils in a respective reaction chamber are associated with a corresponding AC electric power supply. An example of a commercially-available AC power supply suitable for this application is a Model No. LSP 14-400/30 Lepel induction-type power supply.

The AC power from the power supply is transferred to the induction coils by copper (for example) bus bars with external water cooling networks. As discussed in further detail below, a plurality of induction coil assemblies for densifying a corresponding plurality of preforms may be directly supplied with electricity in electrical series or in electrical parallel, without need of additional circuitry such as load balancers and the like.

The Lepel power supply, for example, has remote proportional-integral-derivative (PID) loop control capability and can be monitored and controlled from a computer control terminal. Power density, voltage control, current control, and/or temperature control of the densification process by known methods is also within the scope of the contemplated arrangement.

Using the conventional pancake coils constructed from bent copper tubing (square or round) results in undesirable "spiral" densification (sometimes referred to as a "mirror effect") corresponding to the spiral induction coil. "Spiral densification" is an art-recognized term which generally refers to non-homogenous densification, particularly characterized by generally circumferential "streaks"—regions in which the densification is non-trivially different from adjacent regions. This problem is significantly related to imperfections in coil design, especially with respect to the gap distance between adjacent turns of the coil. It appears that conventional copper tubing is relatively difficult to form (i.e., bend) into a pancake coil while maintaining a consistent gap between adjacent turns of the coil. Accordingly, gaps between coil turns in the conventional structure may occur that lead to insufficient heating of the adjacent preform. This results in turn in poor densification. In addition, pancake coil distance is usually in a fixed position which does not allow for any adjustment for the depth penetration.

Therefore, the system uses induction coils made from, for example, ¼" solid copper plate that is milled or otherwise machined into the desired coil form. Preferably, a high precision machining operation is used to form the coil from the copper plate, such as, for example, computer numerical control (CNC) milling and the like. A copper cooling tube is brazed on an exterior (i.e., opposite the side facing the preform in use) side of the machined copper plate. The braze composition may be any commercially available composition suitable for brazing copper as long as it can withstand the expected temperature environment during the film boiling process (and any other thermal treatment that may be applied).

Figure 4:
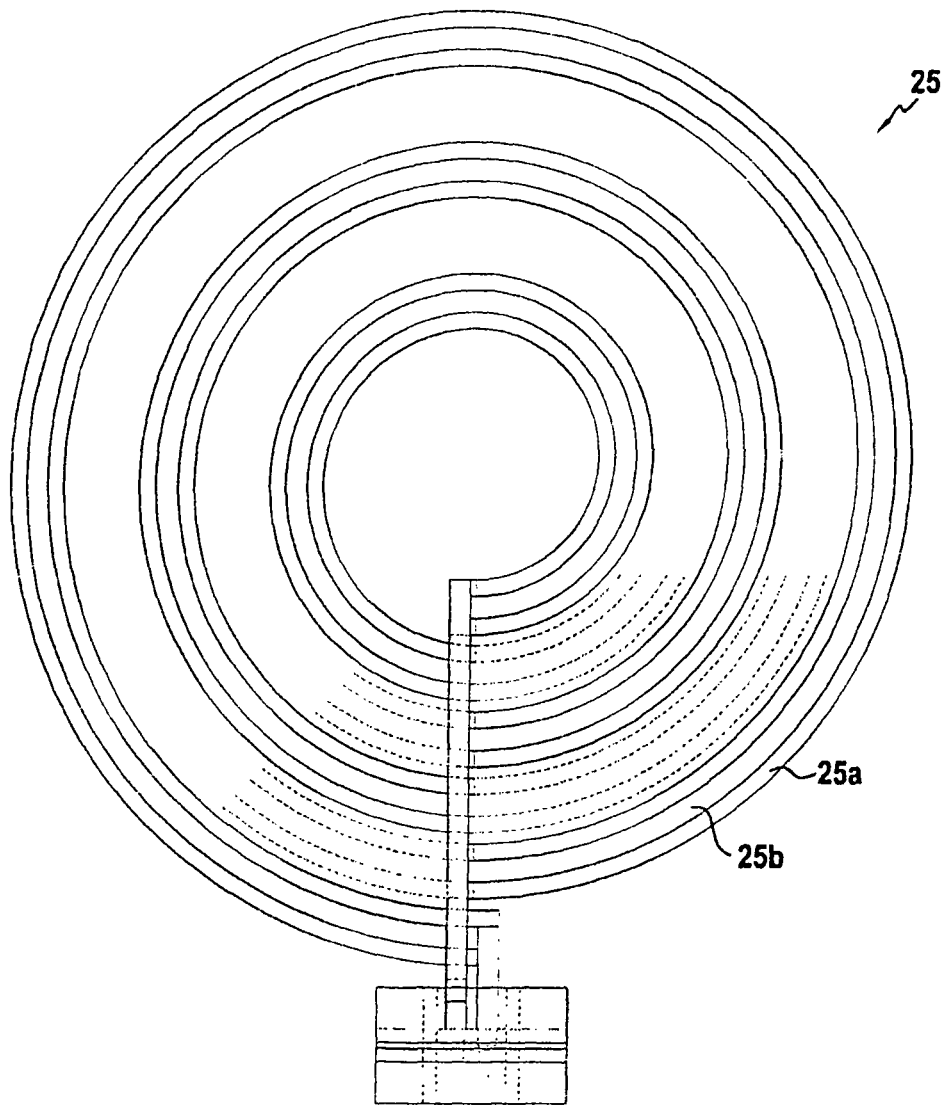
FIG. 4 is a schematic side elevational of an induction coil relevant to the present invention.
Figure 5:
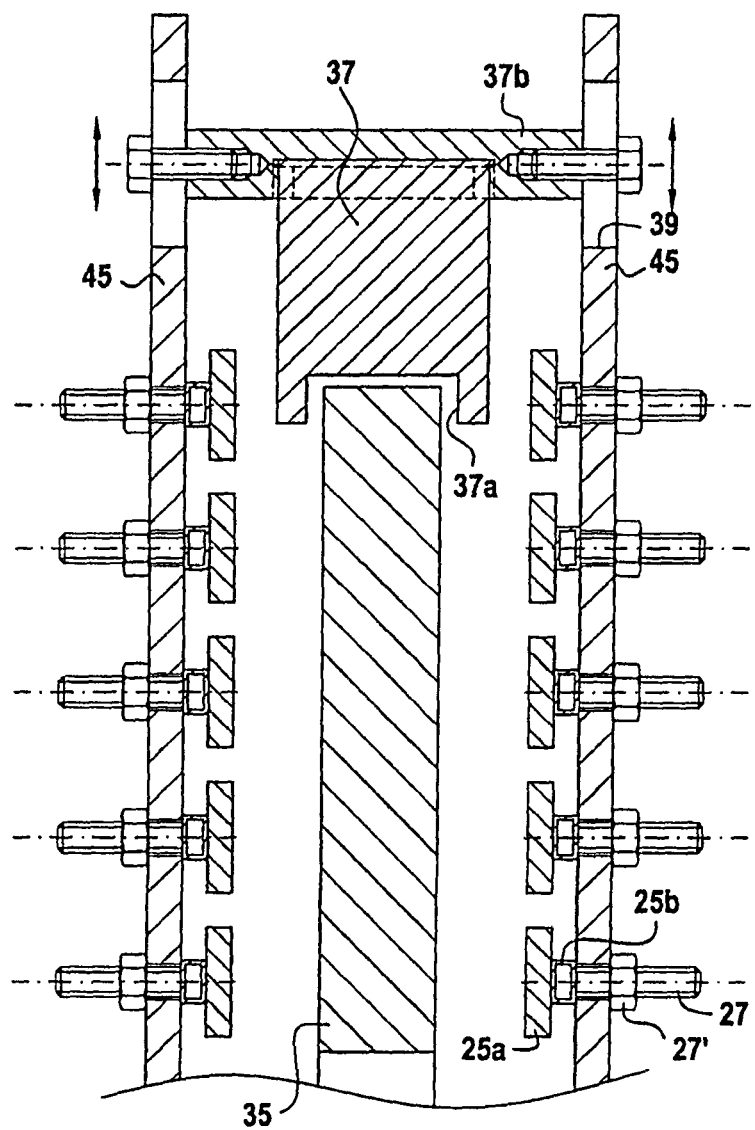
FIG. 5 is a partial cross-sectional view of a portion of a porous article mounted between a pair of induction coils according to an example of the present invention.

Accordingly, the induction coil 25 comprises a solid metal portion 25a (made, for example, by milling a metal plate as described above), and a water cooling tube 25b brazed to the metal portion 25a on a side of the coil opposite from the preform 35. FIG. 4 is a partial side view of an induction coil 25 showing the side of the induction coil on which the water cooling tube 25b is brazed, and FIG. 5 is a partial cross-sectional view of a preform 35 mounted between a pair of induction coils 25 in a frame 45. It is noted that parts of alternating coil turns have been removed from FIG. 4 (as suggested by the dotted lines indicating continuity) to increase the clarity of the drawing.

Because the currently contemplated induction coil uses a machined flat metal plate (made from copper, for example), it can be produced with greater precision (particularly with respect to gaps between turns of the coil) than bending copper tubing. In addition, the machined copper plate does not undergo stress and strain deformation like bent copper tubing.

FIG. 5 hereinbelow is a cross-sectional view of one segment of an induction coil according to the present invention. A mounting fixture, such as a bolt shaft 27 may be conventionally attached to an exterior of the cooling water tube 25*b*. The respective bolt shafts 27 may be used with corresponding nuts 27' or the like to mount each induction coil 25 to a supporting frame 45 (which can be made from G-10 glass or other appropriate chemically neutral material). The preform 35 can be appropriately held relative to the induction coils 25 using supports 37 holding the preform at a plurality of locations at its periphery. The supports 37 could also be made from G-10 glass or another material used for fabricating the frame 45, such as non-reactive quartz glass or alumina cylinders. For example, a support 37 is a hollow cylindrical member having a transverse notch 37*a* formed in one open end, the notch being suitably sized to receive an edge of the preform 35. A different support 37 having a different width 37*a* can be used depending on the thickness of the preform 35. Each support 37 may be mounted relative to the frame 45 using a base 37*b* by bolts or screws and the like. Radially extending slots 39 could be provided in the frame 45 to receive the bolts or screws used for mounting the base 37*b*, so that a radial position of each base 37*b* can be adjusted by moving the fixation point for the base 37*b* therealong according to a diameter of the preform 35 being supported.

Figure 15:
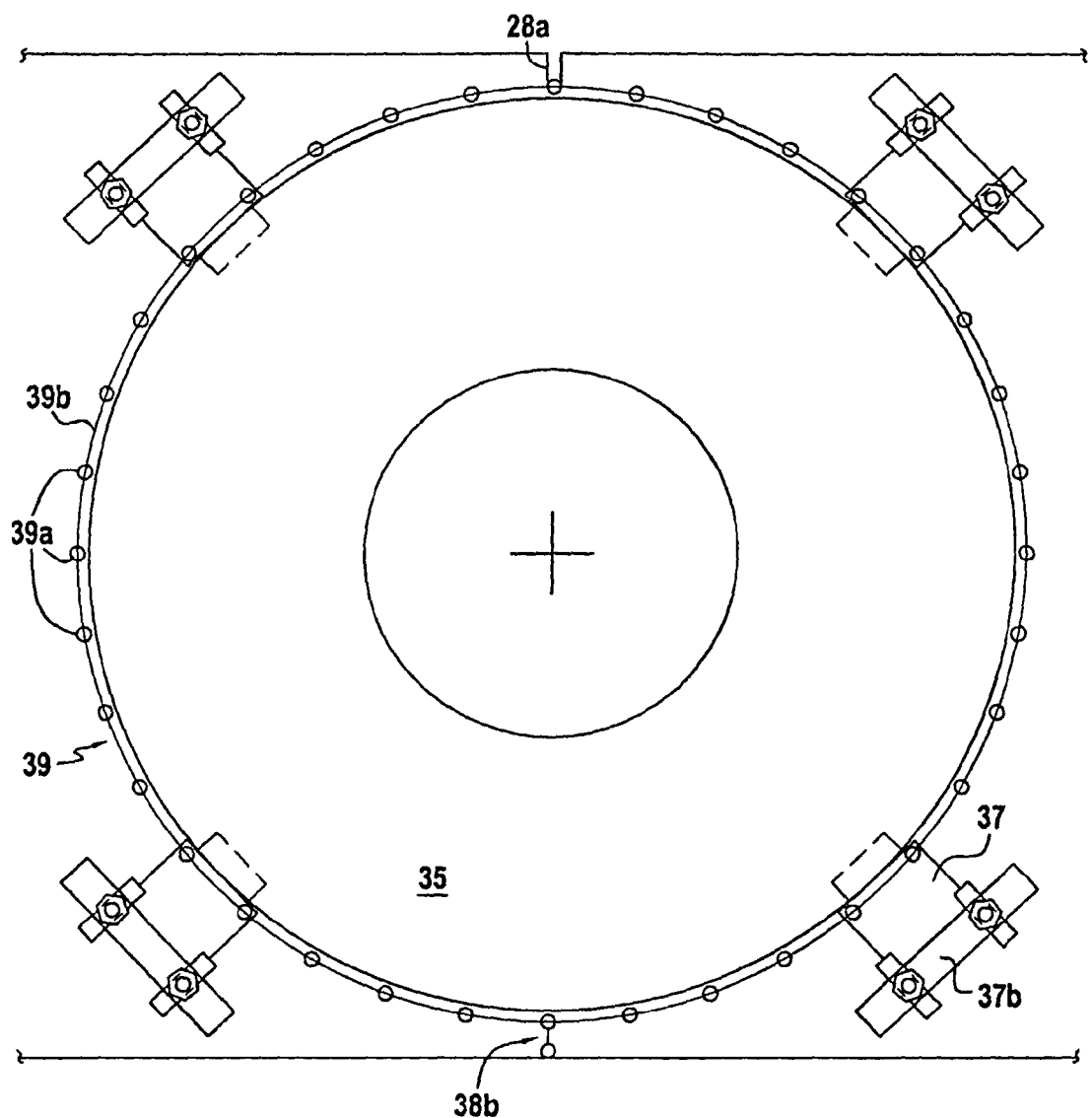
FIG. 15 illustrates variations on how a porous article could be mounted relative to induction coils in the present invention.

It is known in the art that preforms are generally soft and pliable before being densified. Therefore, it is desirable to hold a preform relative to the inductive heating coil in such a manner so as to reduce bending and other forms of warping or deformation before the preform is densified. FIG. 15 illustrates a preform mounting arrangement that is a variation of that illustrated in FIG. 5. In FIG. 15, in addition to supports 37, a suspension belt 39 is provided about a periphery of the preform in order to provide even better support for the preform. The suspension belt 39 comprises, for example, a plurality of regularly spaced apart support members, such as rods or tubes of G-10 glass or alumina that are interconnected by chemically inactive wire or thread 39*b* (such as braided ceramic thread, carbon thread, or fiberglass strands or thread). The belt 39 more evenly supports the weight of the preform 35 so to minimize distortion. The belt 39 could be hung at an upper location 38*a* of frame 45 (only schematically illustrated in FIG. 15) and could be optionally further fixed at a lower point 38*b* to the frame 45 (again, only schematically illustrated in FIG. 15), such as to a cross-member extending between opposite sides of frame 45 (see FIG. 5).

For the preform to reach its full density, it is desirable that the center of the preform initially be heated above the pyrolysis temperature of the precursor liquid. As densification proceeds, the densification moves radially outwards from the center portions of the preform because of the heating profile created by induction heating, in which the surface regions of the preform are cooled, relatively, by contact with the liquid precursor. In one example, the frequency of the power supply is set (in view of the material characteristics of the preform) to provide a skin depth roughly near the center of the preform. As the center of the preform densities, the frequency of the power supply increases in response to changes in the electrical characteristics of the preform caused by densification.

The structure of the induction coils used in film boiling densification processes is very important for obtaining densified preforms having suitable mechanical characteristics, including friction characteristics.

Densification speed is related to the temperature inside the porous structure, and therefore to the power level used. Control of the power used for heating can give a desired densification kinetic.

For example, conventional approaches include controlling the power according to a predetermined (and invariable) power curve "recipe" established to obtain the desired final material. Another conventional approach is to measure the temperature inside the porous structure during densification, so that the power can be controlled according to a temperature set point, or reference. For a carbon brake disk, for example, the inner temperature of a brake preform is typically maintained between 900° C. and 1200° C.

In contrast, the present invention is a method to control the power on the basis of a frequency related parameter related to the densification state of the porous article being densified. The method includes controlling the densification kinetic (i.e., article weight gain (through densification) per time) of the porous article by varying the power level used to generate an electromagnetic field for inductively heating the porous structure.

Certain features of the presently contemplated invention are now discussed hereinbelow, and are distinguished where appropriate with the conventional process of film boiling densification.

Operational parameters that can be considered in defining the densification kinetic for a given porous article are: Initial power setting (P1); Final power setting (P2); Initial plateau duration (T1); Ramp duration (T2); Ramp type (R1—linear) or (R2—polynomial); Final plateau duration (T3); and Preform dimension (R—rotor) or (SS—single stator).

The present invention permits the densification kinetic of a porous article (such as a carbon preform) to be controlled while heating the article through direct electromagnetic coupling. The method is based on indirectly controlling the resonant frequency of an electric circuit composed of inductive heating coils, a power supply, and the porous article during densification. The deposition of the matrix material through the film boiling process causes a variation of the electric characteristics of the assembly of the induction coils and the porous article, which causes the increase of the resonant frequency of the system.

Figure 14:
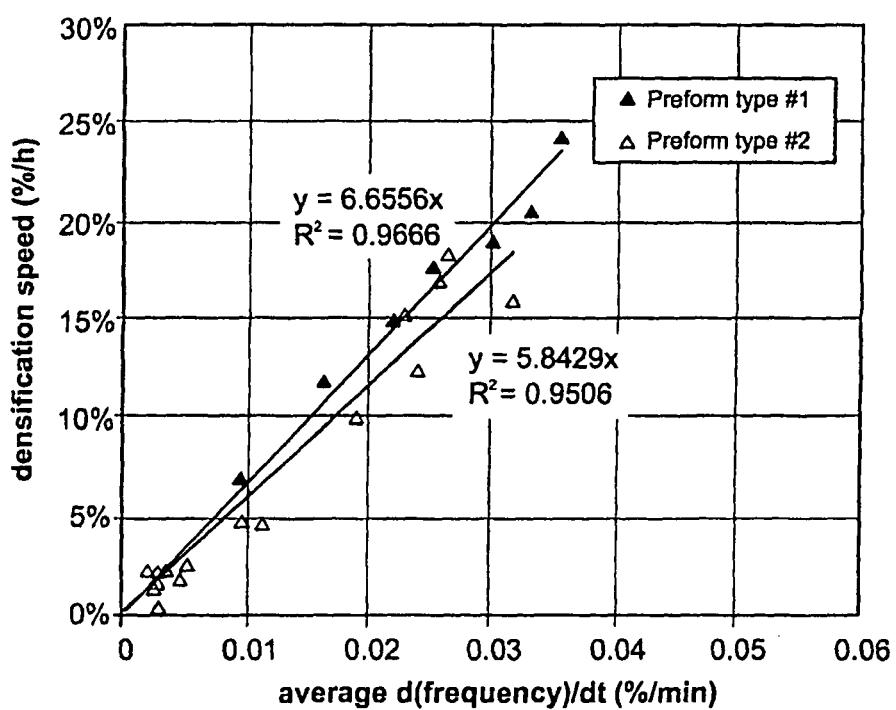
FIG. 14 illustrates the statistical correlation between frequency variation and densification speed (percentage/hour)

FIG. 14 illustrates a statistical correlation ($R^2$) between resonant frequency variation and densification kinetic for two different preforms (using various conditions of power and processing time). For each point, the densification kinetic (weight gain divided by the densification time) has been plotted versus the average variation frequency over the time measured during the cycle. This figure shows that the densification kinetic is highly correlated to the frequency variation. Therefore, by controlling the frequency increase during a densification cycle, it is possible to control the densification kinetic of the part.

To perform such a power control, the power supply must have the ability to continuously match the resonant frequency of the tuning capacitor and the induction coils. For example, the Statipower LSP14 is able to adjust its frequency within a range of about 20-30 KHz. In order to start the densification with a resonant frequency included in this range, the "load frequency" has to be adapted by intentionally changing the inductance of the heating coil or by tuning the amount of capacitance in the power supply.

Thus, during a densification cycle, the initial and final resonant frequencies of the system must be within the range of matching capacity of the power supply (which is, for example, 10 KHz in the case of the Statipower LSP14 power supply), otherwise the tuning capacitance has to be adjusted to decrease the resonant frequency during the densification cycle.

For example, when using induction coils as described above along with the Statipower LSP14 power supply, the resonant frequency variation that occurs during densification cycle of a carbon fiber preform for a 20 inch aircraft wheel is typically less than +8 kHz, which means the resonant frequency matching range of the LSP14 is wide enough to perform the densification of such a preform according to the present invention.

Figure 6:
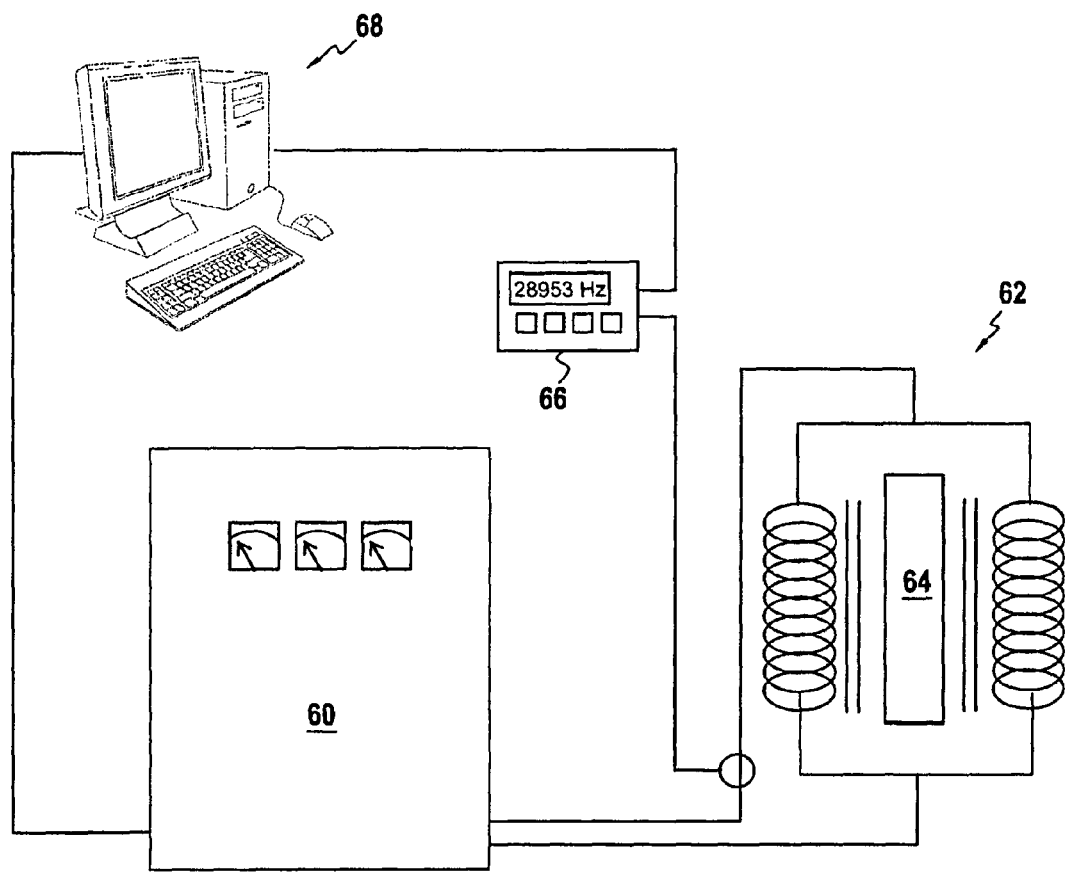
FIG. 6 is a highly schematic illustration of a system for controlling power frequency in an inductive heating system relevant to the present invention.

FIG. 6 is a schematic illustration of a resonant frequency control system used to perform densification cycles according to the concepts described above.

The system includes a power supply 60 having a resonant frequency matching ability (for example, the commercially available Statipower LSP14), an induction coil assembly 62 for heating preform 64 being densified, a frequency meter/gauge 66 (for example, the commercially available Yokogawa 800+) hooked up to the induction coil assembly 62, and a commercially-available computer control system 68 (for example, the commercially available OPTO 22).

During the densification cycle, the frequency meter 66 measures the resonant frequency of the AC electrical power in the coil/preform system, and transmits it to the computer system 68. The computer system 68 automatically calculates the frequency variation between measurements, compares it to a frequency variation set point previously entered in the program and then dynamically adjusts the power output to match or at least move towards the frequency variation set point. (The value illustrated on the face of meter 66 is strictly by way of illustration.)

The frequency variation set point may be fixed or may be varied during a densification cycle.

Figure 12:
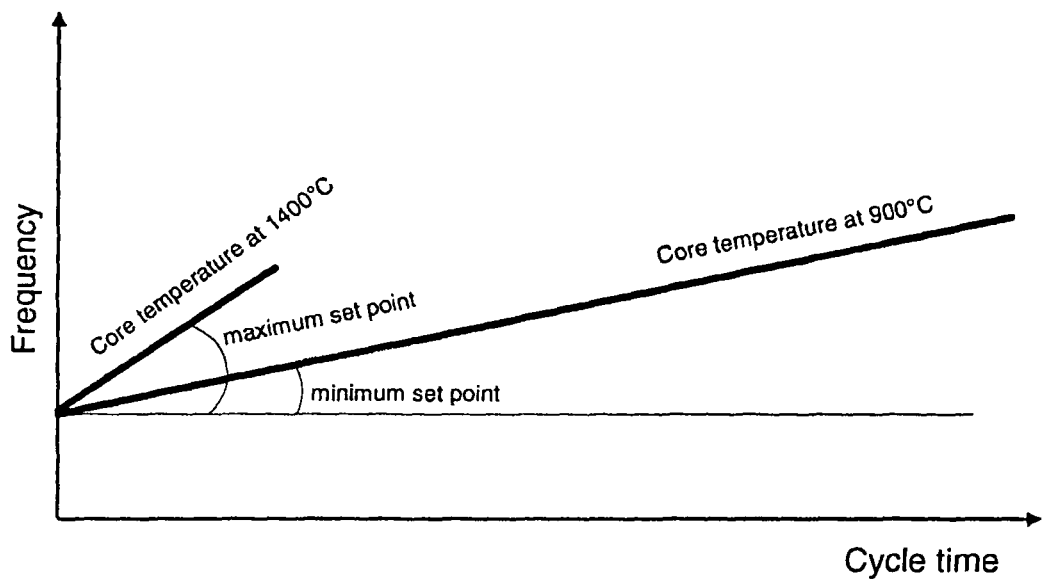
FIG. 12 illustrates the relationship between cycle time and frequency, for selecting minimum and maximum set points.

FIG. 12 illustrates the idea of frequency variation set points. On a graph of frequency versus cycle time, two lines illustrate the change in frequency over time for a core temperature of 900° C. versus for a core article temperature of 1400° C. As can be appreciated, the higher core temperature requires a shorter cycle time and a faster increase in frequency variation. Thus, the corresponding frequency variation set point (which is effectively the slope of the 1400° C. line) is high.

Likewise, the line for 900° C. extends longer over cycle time, reflecting longer densification time needed at the lower temperature. The corresponding set point is therefore appreciably smaller than that of the 1400° C. line.

Seen in this sense, the notion of maximum and minimum frequency variation set points can be seen to correspond to maximum and minimum desired temperatures occurring during densification. Frequency control therefore takes place between these limits, again whether using a single frequency variation set point or whether varying the frequency variation set point within such limits.

Figure 13:
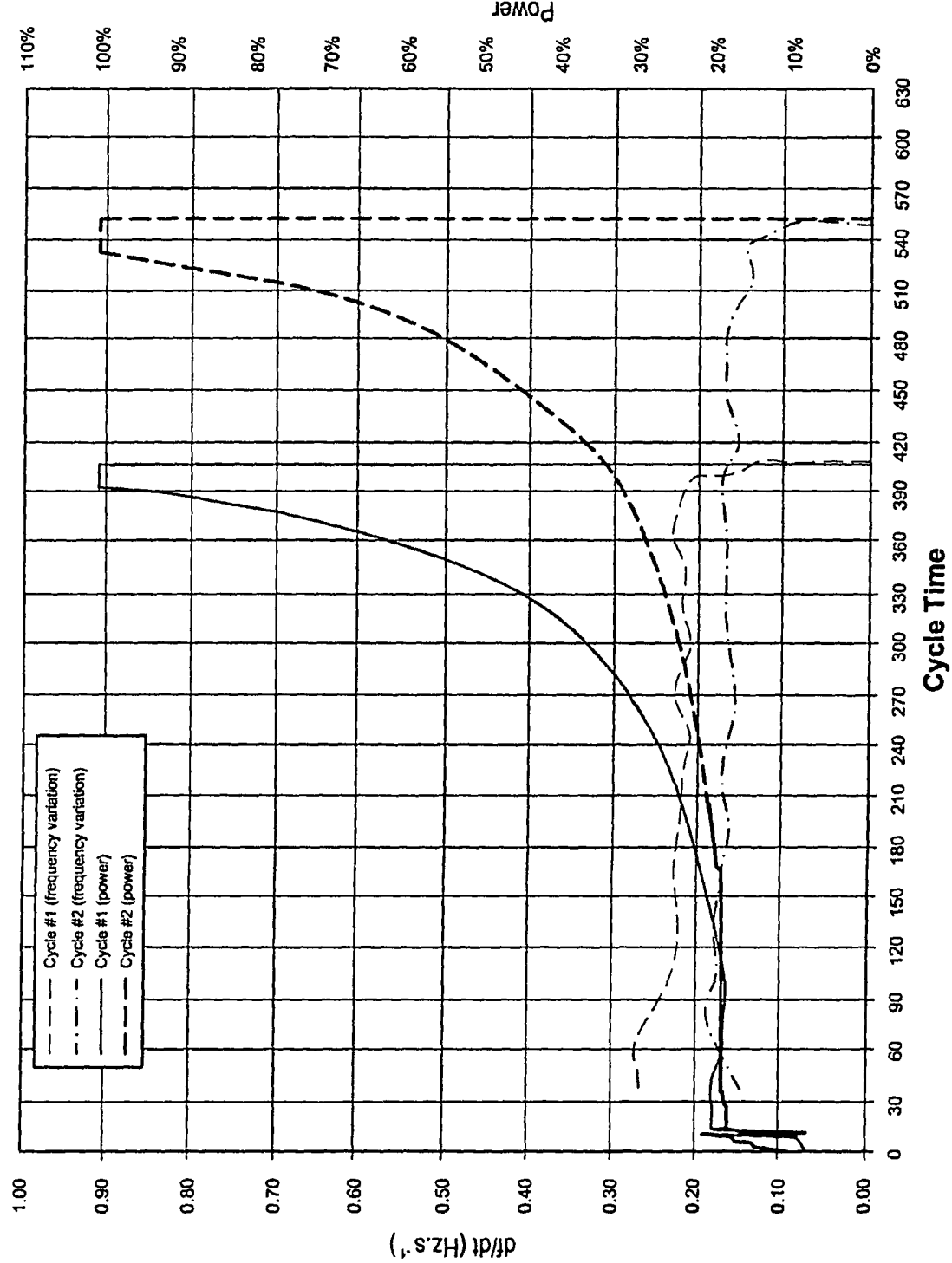
FIG. 13 is a graph illustrating the relationship between cycle time and frequency variation and power level according to the present invention.

FIG. 13 illustrates two densification cycles in which resonant frequency variation is controlled in this sense. Power and frequency variation (change in the frequency over time) are displayed here on the same graph. In this example, the cycles were run at two different frequency variation set points (cycle #1 used 0.22 Hz/s and cycle #2 used 0.15 Hz/s).

During the first part of these densification cycles, when the core of the preform is densified, the power stays relatively low and steady. As the densification front approaches the edges (i.e., the surface) of the preform, the power increases more rapidly to reach the maximum power level allowed. The densification cycle is stopped once the frequency variation is null (indicating effectively complete densification). As expected, the cycle run with the higher frequency variation set point (cycle #1) is the fastest.

The frequency variation set point does not have to be kept constant, it may be gradually increased or decreased as the densification process advances, depending on the desired densification pattern. For a carbon preform being densified, the highest core densities will be obtained when the frequency variation set point is kept as low as possible. The lower this set point is to start the densification, the longer the run will have to be to complete the cycle. Set points outside of these limits cause improper densification.

A peculiarity of this process control is that effect of power variation has a different effect on the resonant frequency at the beginning of densification than at the end. During a typical densification cycle, a constant frequency set point is maintained with a lower (i.e., smaller) power variation at the beginning than at the end. For this reason, the control system software, which makes the power adjustments according to the frequency variation set point, must include a variable power correction factor. Usually, this correction factor has to be set low when the cycle starts and is increased toward the end of the densification run.

Resonant frequency control can be used for improved mass production. Often, the core densification of the preforms is critical. In general, the power during this step has to be carefully controlled in order to avoid the formation of holes inside the disks, which happens when the temperature is too high. Unfortunately, because of the physical variations between preforms and because of direct coupling heating, a temperature inside the porous articles may be different from one cycle to the other even if the same quantity of power is transmitted to the disks. This can be a problem for serial production if the parts are densified in the conventional manner from a power curve recipe (a pre-determined power-time curve).

Frequency control as described hereinabove is a way to improve the densification consistency, because the power is adapted for each disk (notwithstanding differences in physical characteristics therebetween) to obtain a consistent average densification rate.

Another benefit of resonant frequency control is in establishing densification practices for new types of preforms (i.e., with respect to different size, architecture and/or fiber type). Indeed, these parameters have an important effect on the level of power needed to heat the disks. For a carbon disk preform, for example, the thickness of the disk is inversely proportional to the initial power required to reach a given temperature inside the preform.

Another factor strongly affecting densification is the z-fiber rate (which is a percentage value corresponding to the extent of fibers displaced (for example, by needling) along the z-axis, or in other words, along a direction perpendicular to the friction faces of the preform). A higher z fiber rate corresponds to a higher rate of the cooling through the faces of the disk. Therefore, more power is required to attain a desired temperature inside the part. For instance, these factors could require doubling the power to start the densification between one configuration and the other. To set up a power curve requires determining the power levels and densification times during the different phases of a cycle (typically, three phases: a plateau or slow ramp at low power, a ramp to reach the maximum power, and a time to maintain the final high power). Every time a parameter such as preform thickness or architecture is modified, each part of the power curve would have conventionally had to have been optimized in order to get the desired densification, which uses a large amount of time and a large number of wasted preforms.

In contrast, this modification is easy and quick when using the resonant frequency control method described herein, because only one parameter (the frequency variation versus a frequency variation set point) has to be adjusted or otherwise taken into account.

Figure 7:
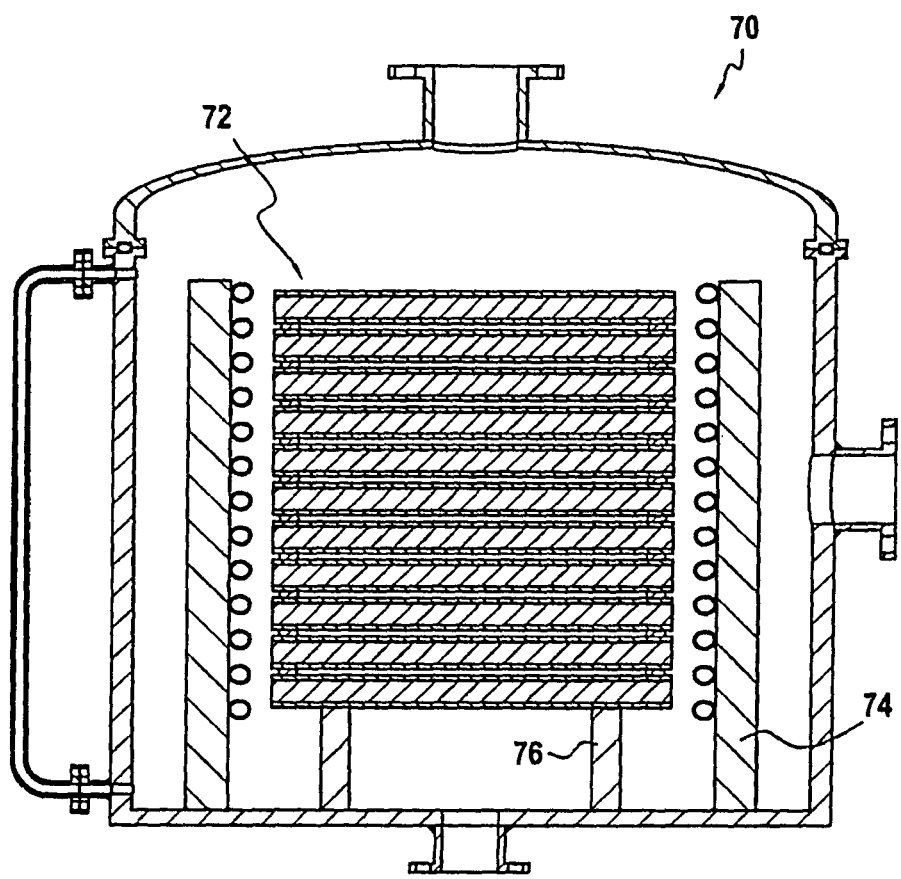
FIG. 7 is a side cutaway view of an alternative arrangement for densifying multiple porous structures.

Multiple porous articles can be usefully densified. For example, an arrangement (see FIG. 7) for densifying multiple porous articles contemplates inserting a plurality of stacked preforms 72 into the reaction chamber 70 (on supports 76 or the like) such that the planes of the preforms are parallel and horizontal. The stacked preforms 72 may be surrounded as a group (unlike in FIG. 8, for example) by a helical induction coil assembly 74 in accordance with the present description.

A main objective of the multiple preform densification as described herein is to demonstrate the concept of multi-part direct coupling using a plurality of induction coil systems (unlike FIG. 7) without the need of a load-balancing device. Load-balancing devices were first introduced by researchers from MIT Lincoln Laboratory in the early 1990's and later adopted by Textron Advanced Materials for the multi-part densification development. At that time, it was commonly believed that induction field interferences and electrical current applied to the multiple preforms could greatly influence the uniformity of the densification process. Therefore, a load-balancing unit was considered essential to equally balance the power density provided to the individual parts being densified in order to create a controlled environment for the multi-parts densification.

In a current experiment, three part coils (14"Ø) were evaluated based on the following responses:
1. weight % pick-up,
2. intermediate machined density,
3. process temperature,
4. current measurement, and
5. tomography scan.

FIG. 8 is a schematic perspective view of a reaction chamber 80 for densifying multiple preforms using multiple induction coil assemblies 82 as described in general above. In the example of FIG. 8, three parallel assemblies 82 of induction coils are electrically connected in parallel to a common bus 84.

An arrangement similar to that illustrated in FIG. 8 was used for testing, which testing indicates that process temperatures and measured electrical currents in each assembly followed each other closely from the three parts without using a load-balancing device. This may imply induction field interference between the respective assemblies is minimal and that power loss is low when using a multiple induction coil arrangement for densifying multiple porous parts. It is however still unresolved; it may also be possible that the field interferences contribute to power balancing.

Overall, all responses from the multiple-part densification study excluding load balancing are consistent and capable of producing carbon disks in at least a three-part densification configuration. Both temperature and current profiling have shown that all three preforms received similar process temperatures and power densities through the densification cycle.

The arrangement of FIG. 8 is strictly by way of example to illustrate the densification of multiple porous parts, and other loading arrangements are possible. More generally, FIGS. 9a-9h and FIGS. 10a-10c schematically illustrate various arrangements in which a plurality of induction coil assemblies could be connected in parallel and in series, respectively, to a power source.

Also, FIGS. 11a-11d illustrate schematically, for a given induction coil pair, various ways in which electrical current can be arranged to flow in the coils.

Providing some form of an insulation material on the outer and inner peripheries of the preforms is also contemplated, to address the issue of irregular densification at the radial edges of the preform. The insulation material is meant to help maintain the heating of the preform at its edges. The insulation material could be as simple as a chemically appropriate felt bound by thread to the inner and outer peripheries of the preform. For example, the insulation material could be carbon felt, fiberglass fabric, or even polytetrafluoroethylene mesh. The binding could be, for example, carbon or fiberglass thread.

Another potential configuration is a mechanical assembly (made from, for example, a chemically appropriate ceramic) that could be mechanically clamped to the inner and outer peripheries of the preform, respectively.

Although the present invention has been described above with reference to certain particular examples for the purpose of illustrating and explaining the invention, it is to be understood that the invention is not limited solely by reference to the specific details of those examples. More specifically, a person skilled in the art will readily appreciate that modifications and developments can be made in the preferred embodiments without departing from the scope of the invention as defined in the accompanying claims.

What is claimed is:

1. A method for densifying one or more porous articles, comprising:
    loading the one or more porous articles in a reaction chamber having one or more induction coils and a tuning capacitor;
    submerging the one or more porous articles and the one or more induction coils in a liquid precursor for a densifying matrix material so that the liquid precursor infiltrates pores in the one or more porous articles;
    inductively heating the one or more porous articles using the one or more induction coils to a temperature sufficient to cause a vapor layer to form at an interior surface of the pores of the one or more porous articles, and sufficient to cause vapor in the vapor layer to pyrolize and deposit the densifying matrix material within the pores of the one or more porous articles; and
    controlling a densification kinetic of each of the one or more porous articles, the densification kinetic being weight gain by a porous article per densification time,
    wherein inductively heating and controlling the densification kinetic of the one or more porous articles comprises matching a resonant frequency of the tuning capacitor with that of the one or more induction coils so as to actively control AC electrical power supplied to drive the one or more induction coils during densification,
        wherein actively controlling electrical power supplied to drive the one or more induction coils during densification includes periodically changing a resonant frequency variation in the AC electrical power supplied to the one or more induction coils during densification, and
        changing the resonant frequency variation of the AC electrical power includes:
            periodically measuring a resonant frequency of the AC electrical power being supplied to the one or more induction coils;

calculating a variation in the measured resonant frequencies of the AC electrical power being supplied;

comparing a respective calculated resonant frequency variation with a resonant frequency variation set point, the resonant frequency variation set point being a predetermined change in resonant frequency over time; and adjusting the AC electrical power level in accordance with the comparison between the calculated resonant frequency variation and the resonant frequency variation set point.

2. The method of claim 1, wherein the resonant frequency variation set point is constant over a given densification cycle.

3. The method of claim 1, wherein the resonant frequency variation set point is variable between minimum and maximum limits.

4. The method of claim 3, wherein the minimum resonant frequency variation set point corresponds to a minimum core temperature of a given porous article at which densification can occur.

5. The method of claim 4, wherein the maximum resonant frequency variation set point corresponds to a maximum core temperature of a given porous article, beyond which densification proceeds so quickly as to result in incomplete densification at a interior part of the porous article.

6. The method of claim 3, wherein the resonant frequency variation set point increases over the course of a densification cycle.

7. The method of claim 1, wherein adjusting the AC electrical power being supplied in accordance with the resonant frequency variation set point is performed dynamically during a densification cycle.

8. The method of claim 7, wherein adjusting a resonant frequency of the electrical power being supplied so as to correspond to a resonant frequency variation set point is performed dynamically and automatically during a densification cycle, using a computer control system.

9. The method according to claim 1, wherein a plurality of induction coils are provided in correspondence with a plurality of porous articles, the plurality of induction coils being electrically connected to a common power source.

10. The method according to claim 9, wherein the plurality of induction coils is electrically connected to a common power source by a single electrical bus.

* * * * *